US008489646B2

(12) United States Patent
Abramson et al.

(10) Patent No.: US 8,489,646 B2
(45) Date of Patent: Jul. 16, 2013

(54) DRAG AND DROP IMPORTATION OF CONTENT

(75) Inventors: Sandra Abramson, Freehold, NJ (US);
Raj Sinha, West Orange, NJ (US);
Anthony Frissora, Fair Haven, NJ (US);
Matt Stevens, Thornton, CO (US);
Mehmet Balasaygun, Freehold, NJ (US)

(73) Assignee: Avaya Inc., Basking Ridge, NJ (US)

( * ) Notice: Subject to any disclaimer, the term of this patent is extended or adjusted under 35 U.S.C. 154(b) by 146 days.

(21) Appl. No.: 12/837,275

(22) Filed: Jul. 15, 2010

(65) Prior Publication Data

US 2011/0047187 A1  Feb. 24, 2011

Related U.S. Application Data

(60) Provisional application No. 61/235,838, filed on Aug. 21, 2009.

(51) Int. Cl.
*G06F 7/00* (2006.01)
*G06F 17/30* (2006.01)

(52) U.S. Cl.
USPC .......................................... 707/802; 715/769

(58) Field of Classification Search
USPC ................... 707/802, 610, 616, 805; 715/769
See application file for complete search history.

(56) References Cited

U.S. PATENT DOCUMENTS

| 7,754,442 | B2 | 7/2010 | Ishihara et al. | |
| 2003/0179154 | A1* | 9/2003 | Demsky et al. | 345/1.1 |
| 2004/0103156 | A1* | 5/2004 | Quillen et al. | 709/206 |
| 2004/0172584 | A1* | 9/2004 | Jones et al. | 715/500 |
| 2005/0218739 | A1* | 10/2005 | Maddin et al. | 310/120 |
| 2005/0268302 | A1 | 12/2005 | Geib et al. | |
| 2006/0136828 | A1 | 6/2006 | Asano | |
| 2006/0190546 | A1* | 8/2006 | Daniell | 709/206 |
| 2007/0174520 | A1* | 7/2007 | Moon | 710/62 |
| 2007/0180468 | A1* | 8/2007 | Gill et al. | 725/45 |

(Continued)

FOREIGN PATENT DOCUMENTS

KR   10-0764473   10/2007

OTHER PUBLICATIONS

U.S. Appl. No. 12/922,829.

(Continued)

*Primary Examiner* — Robert Beausoliel, Jr.
*Assistant Examiner* — Nicholas Allen
(74) *Attorney, Agent, or Firm* — Sheridan Ross P.C.

(57) ABSTRACT

A system allows a user to drag content from one application and drop the content into a separate application. In response to the user interface functions of dragging and dropping the content, an importation system can create a data object. The object can have fields that are defined based on the application or data being dragged. The object fields may be automatically populated using a search function that searches for data in the application that may be highlighted during the drag function. The drop is intercepted the information is formatted for the receiving application. The information is formatted to meet the specifications of the receiving application to optimize the storage and use of the information. Thus, the system can translate the information from its native format into a format understandable by the receiving application.

19 Claims, 11 Drawing Sheets

U.S. PATENT DOCUMENTS

| | | | | |
|---|---|---|---|---|
| 2007/0244987 | A1* | 10/2007 | Pedersen et al. | 709/217 |
| 2007/0294632 | A1* | 12/2007 | Toyama et al. | 715/764 |
| 2008/0155478 | A1* | 6/2008 | Stross | 715/849 |
| 2008/0205655 | A1* | 8/2008 | Wilkins et al. | 380/279 |
| 2008/0299959 | A1* | 12/2008 | Geyer et al. | 455/418 |
| 2008/0307324 | A1 | 12/2008 | Westen et al. | |
| 2009/0140986 | A1* | 6/2009 | Karkkainen et al. | 345/173 |
| 2009/0172081 | A1 | 7/2009 | Bryant et al. | |
| 2009/0198780 | A1* | 8/2009 | Koch | 709/206 |
| 2009/0300510 | A1 | 12/2009 | Gantman et al. | |
| 2010/0061534 | A1* | 3/2010 | Wang et al. | 379/201.03 |
| 2010/0159966 | A1* | 6/2010 | Friedman et al. | 455/466 |
| 2010/0278442 | A1 | 11/2010 | Parsons et al. | |
| 2010/0325391 | A1 | 12/2010 | Talla | |
| 2011/0179001 | A1 | 7/2011 | Lindsley et al. | |

OTHER PUBLICATIONS

International Search Report for International (PCT) Patent Application No. PCT/US2010/045769, mailed Apr. 29, 2011.
Written Opinion for International (PCT) Patent Application No. PCT/US2010/045769, mailed Apr. 29, 2011.
Extended European Search Report for EP Patent Application No. 10172803.8, mailed Apr. 4, 2012.
International Preliminary Report on Patentability for International (PCT) Patent Application No. PCT/US2010/045769, mailed Mar. 1, 2012.
Official Action for U.S. Appl. No. 12/922,829, mailed Mar. 6, 2013 15 pages.

* cited by examiner

DRAG AND DROP IMPORTATION OF CONTENT

CROSS REFERENCE TO RELATED APPLICATIONS

This application claims the benefit of and priority under 35 U.S.C. §119(e) to U.S. Patent Application No. 61/235,838, filed Aug. 21, 2009, entitled "MOJO," which is incorporated herein by reference in its entirety.

BACKGROUND

Software applications executed in computer systems or other devices create, store, receive, or send content. Content is the data or information used in the software application. Content can be ported between applications. However, porting content from one application to another, if the applications are unrelated in function, can be a troublesome process of copying and pasting separate portions of the content from one application to another. For example, porting content between a phone system and a contacts application (e.g., Microsoft Outlook) can be very difficult. Often, the user is required to put the content into the required fields and ensure the content is optimally imported.

SUMMARY

The embodiments presented herein allow a user to drag content from one application and drop the content into a separate application. For example, the contact information from a web-based telephone call can be highlighted and dragged to Outlook. The contact information can be dropped into Outlook. In response to the user interface functions of dragging and dropping the content, an importation module can create a data object. The object can have fields that are defined based on the application or data being dragged. The object fields may be automatically populated using a search function that searches for data in the application that may or may not be highlighted during the drag function. The drop is intercepted by an interceptor component, and the information is formatted for the receiving application. The information is formatted to meet the specifications of the receiving application to optimize the storage and use of the information. Thus, the system includes a set of translators that translate the information from its native format into a format understandable by the receiving application.

In further embodiments, missing information may be completed by the system. Thus, the system determines if the information dropped into the receiving application is missing any data. If data is missing, a search function can search one or more applications or Internet sources for the missing information. For example, if the work address is missing from contact information dropped into Outlook, the system can search one or more social networking sites for the information. For example, the name and/or phone number may be used to search Facebook, MySpace, LinkedIn, Spoke, Twitter, or other sites for the name and/or phone number. Using various rules to determine the likelihood of a positive match, the missing information may be copied and imported into the application.

Further, the system may determine a best action for the content based on where the content is dropped. For example, if the content is dropped in a communication application, the best action may be to call the user associated with the content. As such, the drop may be for more than simple pastes.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The term "in communication with" as used herein refers to any coupling, connection, or interaction using electrical signals to exchange information or data, using any system, hardware, software, protocol, or format.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material".

The term "computer-readable medium" as used herein refers to any tangible storage that participates in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, or any other medium from which a computer can read. When the computer-readable media is configured as a database, it is to be understood that the database may be any type of database, such as relational, hierarchical, object-oriented, and/or the like. Accordingly, the embodiments are considered to include a tangible storage medium and prior art-recognized equivalents and successor media, in which the software implementations are stored.

The terms "determine", "calculate" and "compute," and variations thereof, as used herein, are used interchangeably and include any type of methodology, process, mathematical operation or technique.

The term "module" as used herein refers to any known or later developed hardware, software, firmware, artificial intelligence, fuzzy logic, or combination of hardware and software that is capable of performing the functionality associated with that element. Also, while the embodiments are described in terms of examples, it should be appreciated that individual aspects of the embodiments can be separately claimed.

BRIEF DESCRIPTION OF THE DRAWINGS

The present disclosure is described in conjunction with the appended figures.

In the appended figures, similar components and/or features may have the same reference label. Further, various components of the same type may be distinguished by following the reference label by a letter that distinguishes among the similar components. If only the first reference label is used in the specification, the description is applicable to any one of the similar components having the same first reference label irrespective of the second reference label.

DETAILED DESCRIPTION

The ensuing description provides embodiments only, and is not intended to limit the scope, applicability, or configuration of the claims. Rather, the ensuing description will provide those skilled in the art with an enabling description for implementing the embodiments. It being understood that various changes may be made in the function and arrangement of elements without departing from the spirit and scope of the appended claims.

Figure 1:
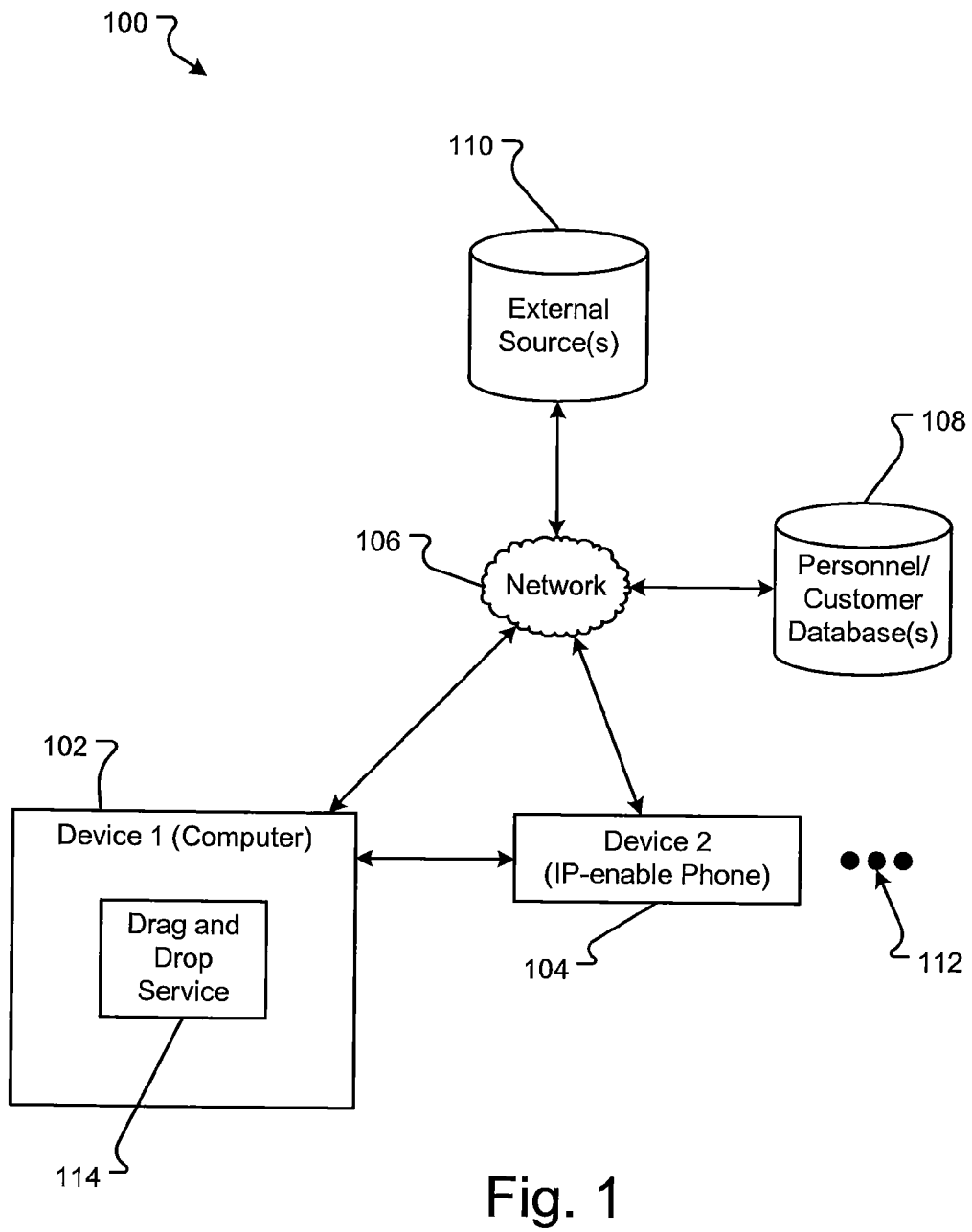
FIG. 1 is a block diagram of an embodiment of a system for the importation of content.

An embodiment of a system 100 for importing content between different programs that may be running on different devices is shown on FIG. 1. The system 100 can include device 1 (e.g., a computer) 102 and one or more devices that may interact with the computer, such as, device 2 (e.g., an IP enabled telephone) 104. The one or more devices that interact with the computer 102 may communicate either directly with the computer 102 or through a network 106. The computer 102 can be any computer system or computers as described in conjunction with FIG. 9 and FIG. 10. Generally, the computer 102 can include a processor and memory and be able to execute applications on the processor. The other devices, such as, IP-enabled phone 104, may also have a processor memory and execute applications. The other devices may also be a computing system or computer as described in conjunction with FIG. 9 and FIG. 10. In embodiments, the system 100 includes more devices than those shown in FIG. 1, as represented by ellipses 112.

Figure 9:
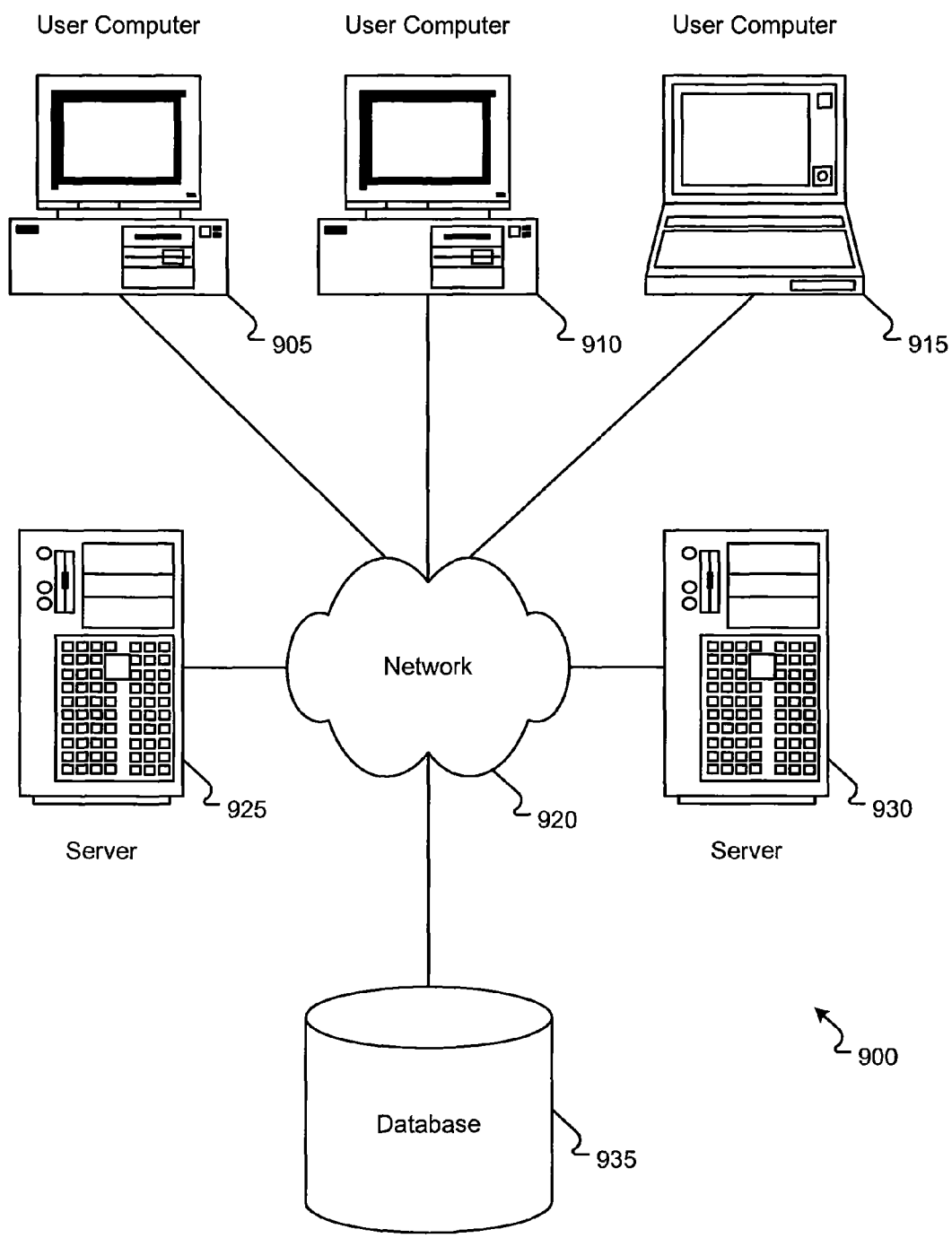
FIG. 9 is a block diagram of an embodiment of a computing environment operable to execute the embodiments described herein.
Figure 10:
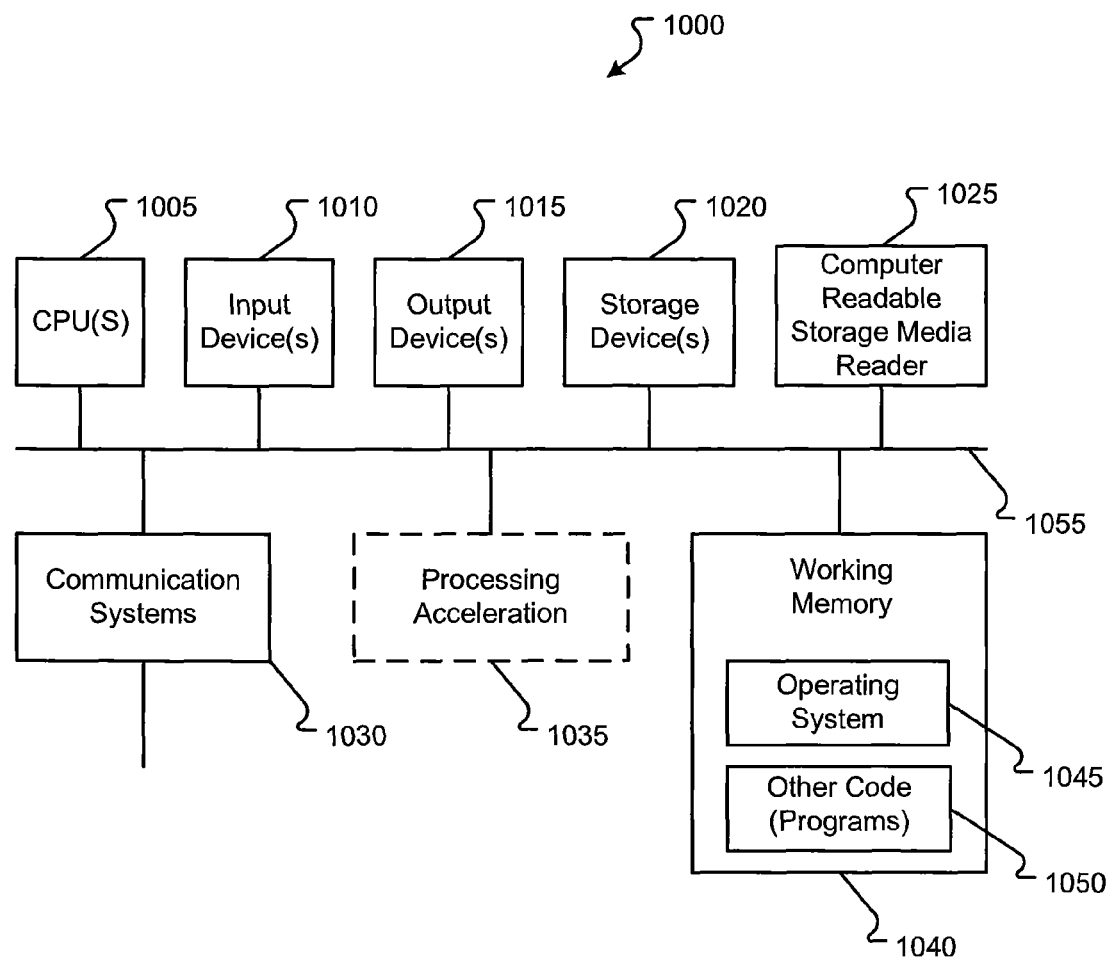
FIG. 10 is a block diagram of an embodiment of a computer or computing system environment operable to execute as the one or more devices described herein.

The network 106 can be any network or communication system as described in conjunction with FIG. 9 and FIG. 10. Generally, the network 106 can be a local area network (LAN) that receives and transmits messages or data between devices, such as, computer 102 and IP-enabled phone 104. The network 106 may communicate in any format or protocol known in the art, such as, transmission control protocol/internet protocol (TCP/IP), 802.11G, N, etc., or other formats or protocols.

The system 100 can also include one or more databases or be able to communicate with one or more databases. For example, a personnel/customer database 108 may store information about personnel within an organization or customers that are associated with an organization. The personnel/customer database 108 can be any type of databases described in conjunction with FIG. 9 and FIG. 10 and stored on any type of tangible computer readable medium. The devices, such as the computer 102, can communicate with the personnel/customer database 108 through the network 106.

Other databases may be external to the organization, such as external source(s) 110. The external source(s) 110 can be any database as described in conjunction with FIG. 9 and FIG. 10 or can be a source of information that is external to the organization. For example, external source(s) 110 can be information extracted from social media sources, for example, Facebook, Plaxo, LinkedIn, or other such sources of information. The devices, such as computer 102, can communicate with the external source(s) 110 through the network 106 and one or more other networks that may not be shown in FIG. 1.

The system 100 can also include a drag and drop service 114. The drag and drop service 114 can be a software module executed on at least one device in the system 100. For example, device 1 102 is executing the drag and drop service 114 in the embodiment shown in FIG. 1. It should be noted that the drag and drop service 114 may be executed on a server or other computer system that communicates with both device 1 102 and device 2 104. The drag and drop service 114 is operable to extend the user interface, as described in conjunction with FIG. 3, across the user interface displays of the two or more devices (e.g., device 102 and 104). The drag and drop service 114 may provide information to the devices to allow the devices 102 and/or 104 to render the user interface and to display movements of user interface devices (e.g., cursors, pointers, dragged content, etc.).

Further, the drag and drop service 114 can provide information that initiates the transfer of content between applications executing on the devices 102 and/or 104. Upon the selection of content, a signal may be sent from the device 102 and/or 104 to the drag and drop service 114 indicating the user interface action. A subsequent drop of content in the other device's portion of the user interface display can signal the drag and drop service 114 to begin the importation of content. Thereinafter, data transfers between devices 102 and/or 104 can occur using XML, SIP messaging, or other communications systems to import content from one device to another device.

Figure 2:
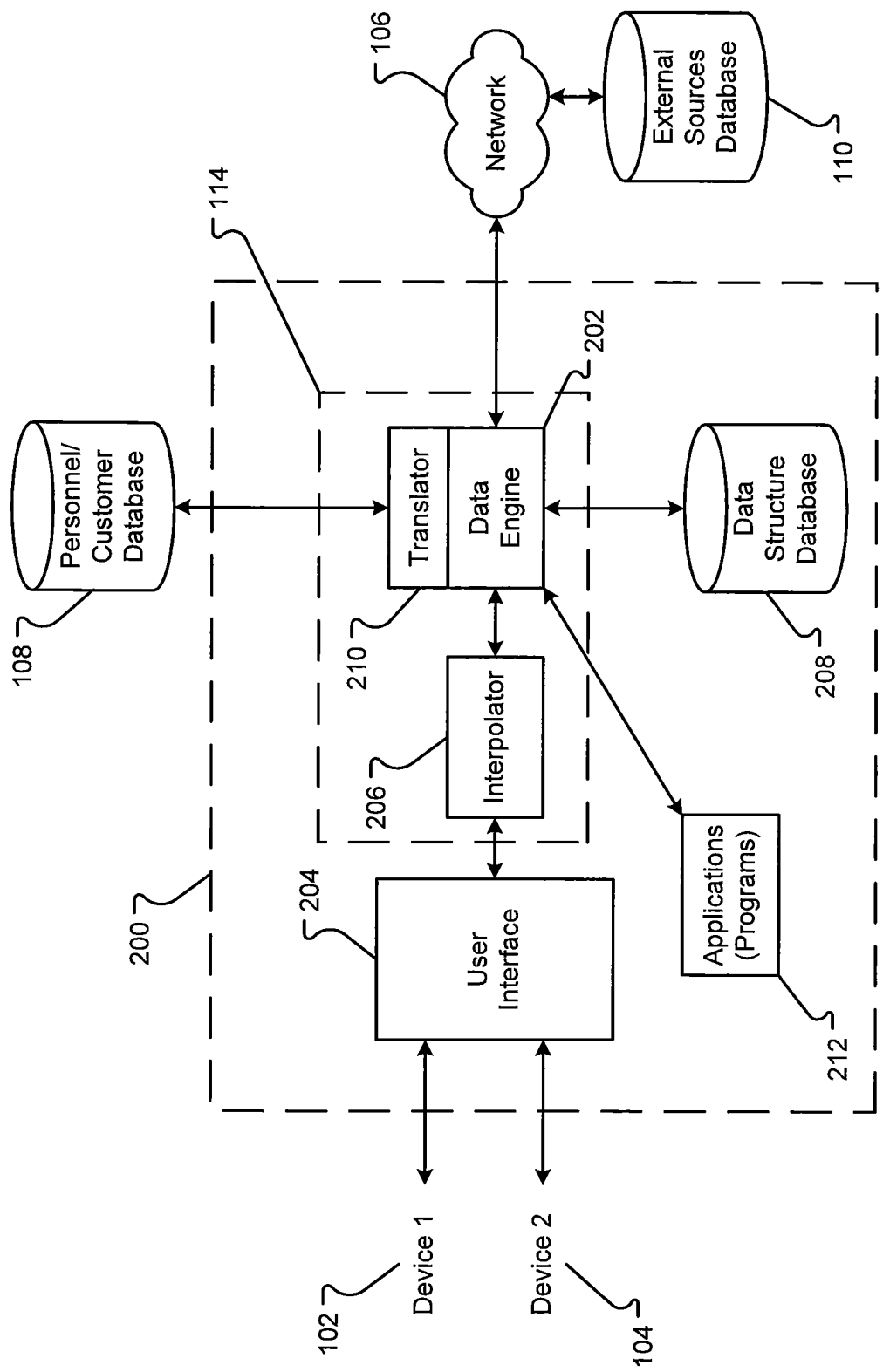
FIG. 2 is a block diagram of an embodiment of a computer system operable to drag and drop content between applications.

Embodiment of a software system 200 that can import content between programs and/or devices is shown in FIG. 2. The components shown in the software system 200 can execute on one or more of the devices, such as, the computer 102 and/or the IP enabled telephone 104. In other embodiments, the software can be executed in another system, such as a server, not shown in FIG. 1 or in a cloud computing environment, also not shown in FIG. 1. Thus, the software system 200 can be a software service or other program that is operable to import content.

The software system 200 can include a user interface 204. The user interface 204 can include a virtual desktop user display that is stretched across two or more displays (e.g., computer monitors), such as the display for the computer 102 and the display for the IP-enabled phone 104. Thus, the user interface may be a display that appears as a single virtual desktop that is displayed across two or more physical displays. The user interface can receive selections or inputs from user interface devices, such as a mouse, a keyboard, a touch screens, or other input devices. The user interface selections are received by the user interface 204 and provided to an interpolator 206.

The interpolator 206 can interpret the user interface selections received by the user interface 204. For example, the interpolator 206 can determine the source program from which content is selected by a first user interface action within a certain area of the user interface. Further, the interpolator 206 can also determine the destination program by the last user interface action that "drops" content into another program. The interpolator 206 may be able to determine the programs and devices to which the user selections have occurred or are associated with. This determined information, including the program identity, device identities, and other information is provided, by the interpolator 206, to a data engine 202. The source program and destination program are included in the group of applications 212 that are executing in the software system 200.

To assemble or import content between different programs, the data engine 202 can use a data structure (also referred to as a user interface data structure) that can be retrieved from the data structure database 208. Using the information received from the interpolator 206, the data engine 202 can retrieve the appropriate data structure from the data structure database 208. The data engine 202 can then copy data from the source program into the data structure. In some instances, the copied information is in a proprietary format. As such, the data engine 202 may include a translator 210 that can translate the data from the proprietary format into a general format, for example, extensible markup language (XML). Thus, the data incorporated into the data structure is in a general format and may be more easily translated or placed in a destination program.

The data engine 202 can also determine if all the information within the data structure is retrieved from the source program. If information is lacking in the data structure, the data engine 202 is operable to communicate with one or more other sources of data to retrieve that data. For example, the data engine 202 can communicate with a personnel/customer database 108 to retrieve more information for the data structure. In other embodiments, the data engine 202 can interface, through a network 106 and one or more other networks, to the external source(s) 110 to retrieve information for the data structure. For example, the data engine 202 can retrieve information from social media sites such as Facebook, Plaxo, LinkedIn®, etc. The other information is retrieved from the external sources and included into the data structure.

After completing the retrieval of data, the data engine 202 may then paste or copy data from the data structure into the destination program. As with the source program, the destination program may store data in a proprietary format. Thus, the translator 210 may translate the data from the general format (e.g., XML) to the proprietary format to be included into the destination program. Then, the translated information may be sent through the interpolator 206 to the user interface 204 for viewing on the display; the data engine 202 can interact directly with the destination application 212 to paste or insert the data into the destination application 212. As such, any communications for data can be completed directly from the data engine to an application 212 and then shown on the user interface 204.

Figure 3A:
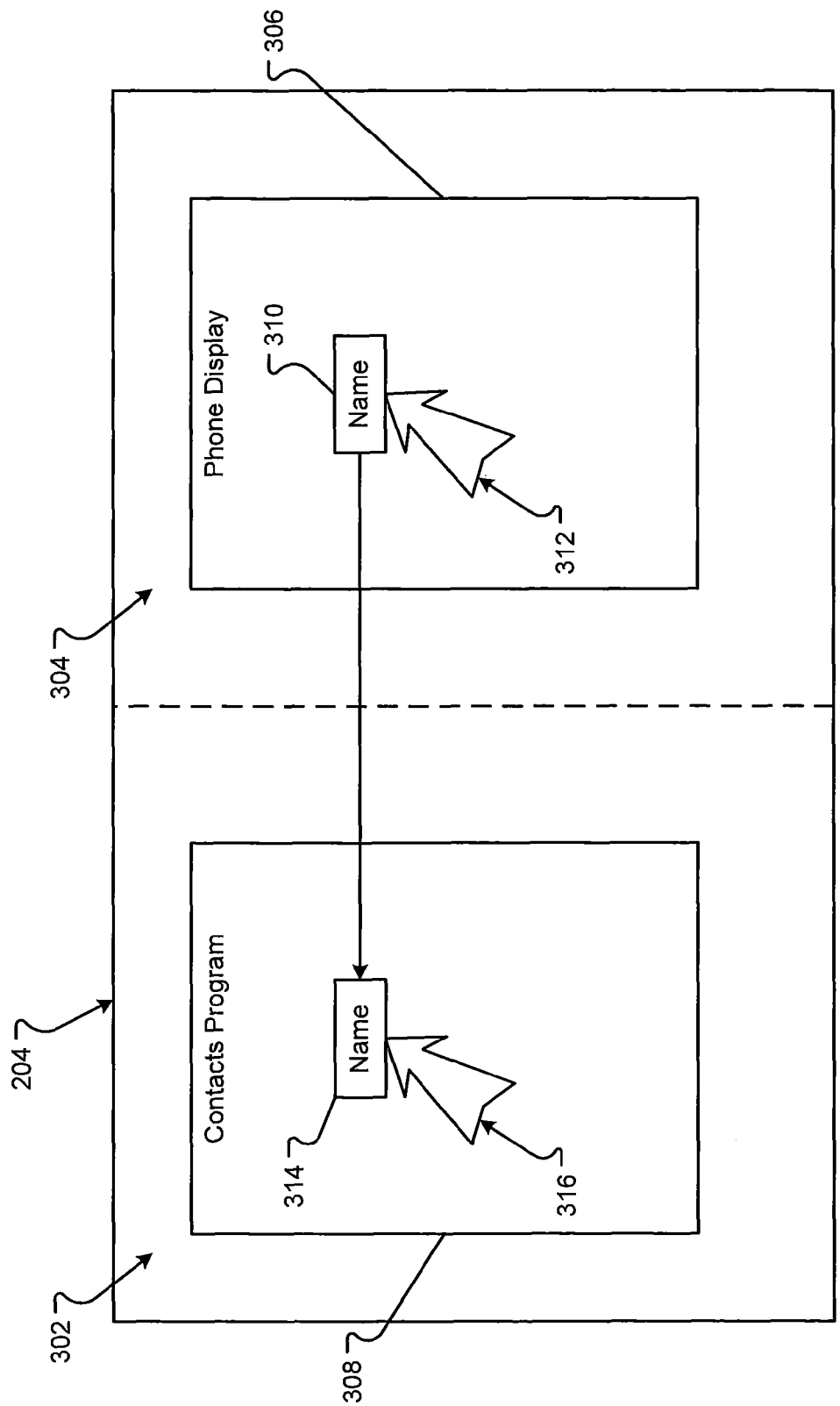
FIGS. 3A and 3B are embodiments of a user interface showing the drag and drop of content.
Figure 3B:
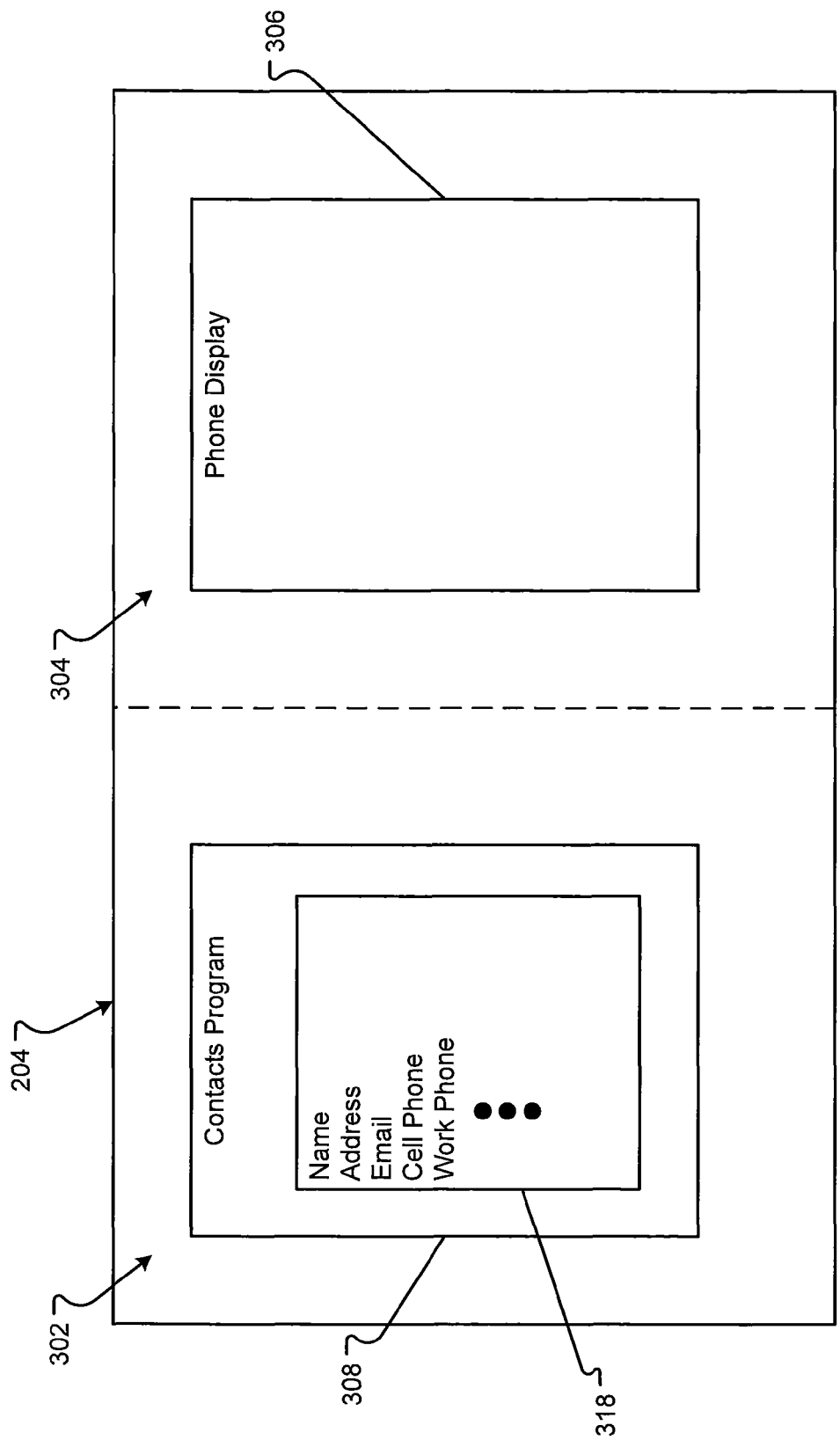

An embodiment of a user interface, which could be the visual display of user interface 204, is shown in FIG. 3A and FIG. 3B. The user interface 204, in the embodiment shown, is a virtual desktop that is spread across two or more device displays. For example, the portion 302 of the user interface 204 can be displayed on the computer 102 display. Similarly, the portion 304 is displayed on the IP enabled telephone display 104. Here, each of these different displays is executing a program on the different device. For example, a contacts program 308 is executing on the computer 102 and is shown in user interface display portion 302. Similarly, a phone application is on the IP enabled telephone 104 and displayed in user interface portion 304. A user may be able to interact with both portions 302 and/or 304 of the user interface 204 with one or more user interface devices.

Content may be imported from one application, executing in the user interface, to another application, executing in the user interface 204. For example, the user may employ a visual icon 312, for example, a pointer, which is associated with and reacts to movement of a user interface device, such as, a mouse. The pointer 312 may be used to select or "click" content within the user interface portion 306. In the embodiment shown, the pointer 312 selects a name display 310 shown in the phone application display and then drags that name 310 to the contacts program such that the pointer 316 drops the name data 314 into the contacts program 308. This drag and drop of content may then trigger the importation of content from the phone application or other sources into the contacts program. For example, if a user wants to create a contact in a contacts program for a person that is being identified in a conversation on the IP-enabled phone 104, the user needs to drag and drop the name from the phone application display to the contacts program. Thus, by dragging and dropping one item of content, the data engine 202 can import one or more other items of content that may be associated with the item of content that is subject to the drag and drop.

The display of the user interface 204 created after new data is input into the contacts program is shown in FIG. 3B. The new data imported into the contact program is shown in user interface portion 302; a new data entry 318 is created within the contacts program 308 in response to the importation of content. The data entry 318 can include one or more items of data copied either from the phone program 306 or from one or more other sources. Thus, as shown, a mere drag and drop of a single piece of content can create a new data entry in another application with more data that dragged into the application. While a phone application display 306 and contacts program display 308 are shown in the embodiments of FIG. 3A and FIG. 3B, other programs or applications may also participate in the drag and drop of content, as will be explained hereinafter. The data engine 202 may be able to determine the source and destination programs and extract the appropriate data based on those pairings regardless of what application is the source program and what application is the destination program.

Figure 4:
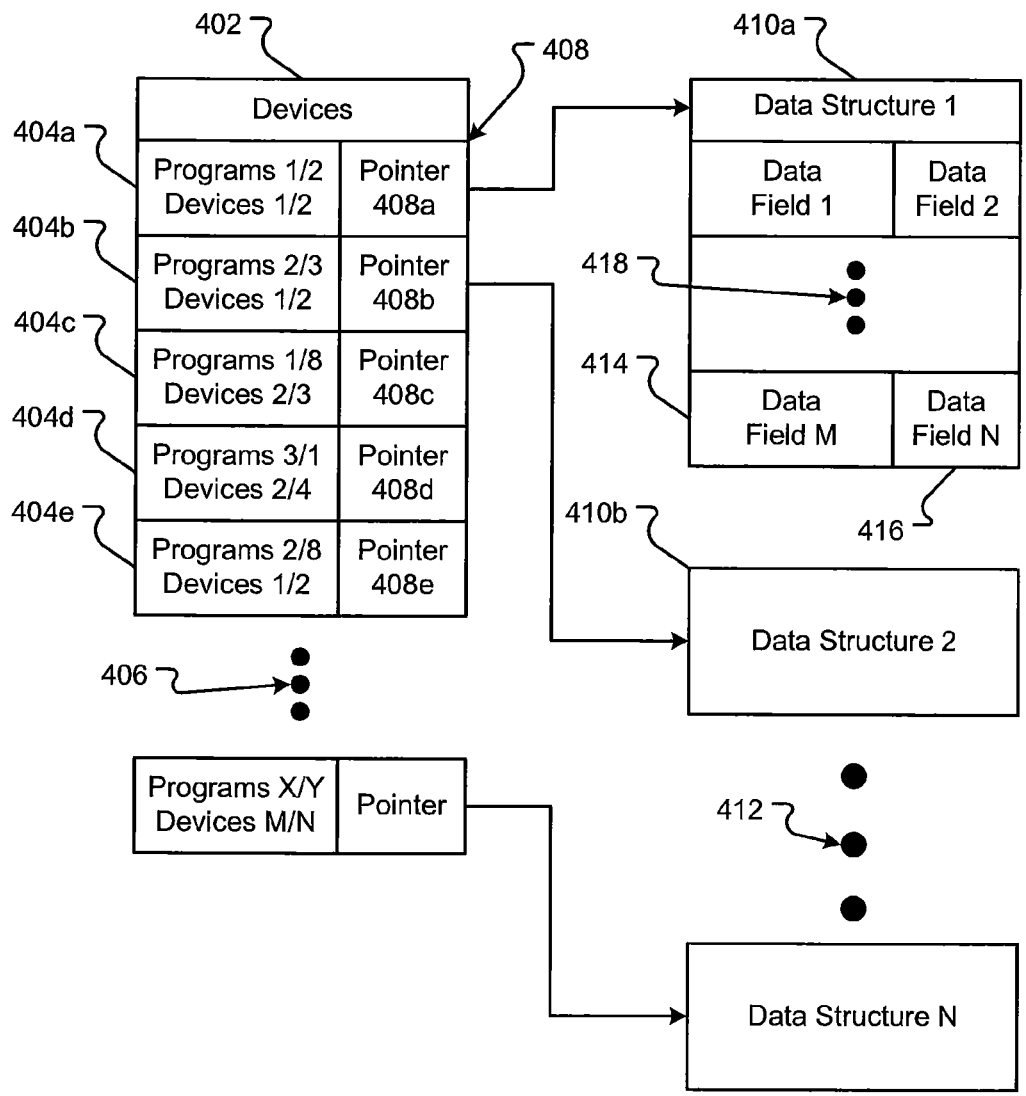
FIG. 4 are block diagrams of embodiments of data structures operable to move content between applications.

Embodiments of data structures that may be included in the data structure database 208 are shown in FIG. 4. The data structures can include one or more segments or fields, which store data in an organized fashion. The data structures may be associated with one or more types of databases including flat file databases, object orientated databases, relational databases, etc. Further, the data structures may be components of databases as described in conjunction with FIGS. 9 and 10.

A devices data structure 402 can include device pairings and/or application pairings. For example, the devices data structure 402 can include one or more fields 404a, 404b, 404c, 404d, 404e, etc. that include a pairing between a first device and a second device and/or a pairing between a first program and a second program. For example, the pairings may include a pairing of the phone application 306 and the contacts application 308. The first listed program and/or device can be the source program and/or device and a second program and/or device can be the destination program and/or device. These pairings define which data structure should be used for copying data from the source application to the destination application. The pairings may be determined by the data engine 202 from information received from the interpolator 206.

Included with the entry 404 is a pointer 408. The pointer 408 is a link or software code that points the data engine 202 to the appropriate data structure to use in importing content. The pointer 408 points to one or more of the data structures 410(a), 410(b), etc. There may be more or fewer device/program pairings than those shown in FIG. 4, as represented by ellipses 406. Also, there may be as many available data structures 410 as there are device/program pairings. There may be more or fewer data structures 410 in the data structure database 208, as represented by ellipses 412.

The data structures 410 may include one or more data fields 414 and/or 416. The data fields 414 and/or 416 for each data structure 410 can be particular to the type of source application and/or device and destination application and/or device. Further, each data structure 410 may have more or fewer fields than those shown in data structure 410a, as represented by ellipses 418. Also, each data structure 410 can include a set of metadata that describes the data within that data structure 410. The metadata can describe how the data should be copied from the source application/device and/or pasted into the destination application/device, may describe how to translate the data, may describe other external sources for the data (e.g., Facebook, governmental records, etc.) where the data may be retrieved, or other information that enables the importation of content.

The metadata may be created automatically through intelligence agents that are able to interpret the function of source and/or destination applications or may be entered manually through user input. As such, the user can create new data structures 410 for new device/program pairings as new devices or applications are added. The creation of the data structure 410 may be automated by the data engine 202 traversing or reviewing data within that source and/or destination programs and creating data structures 410 that will be operable to store and/or import that content.

Figure 5:
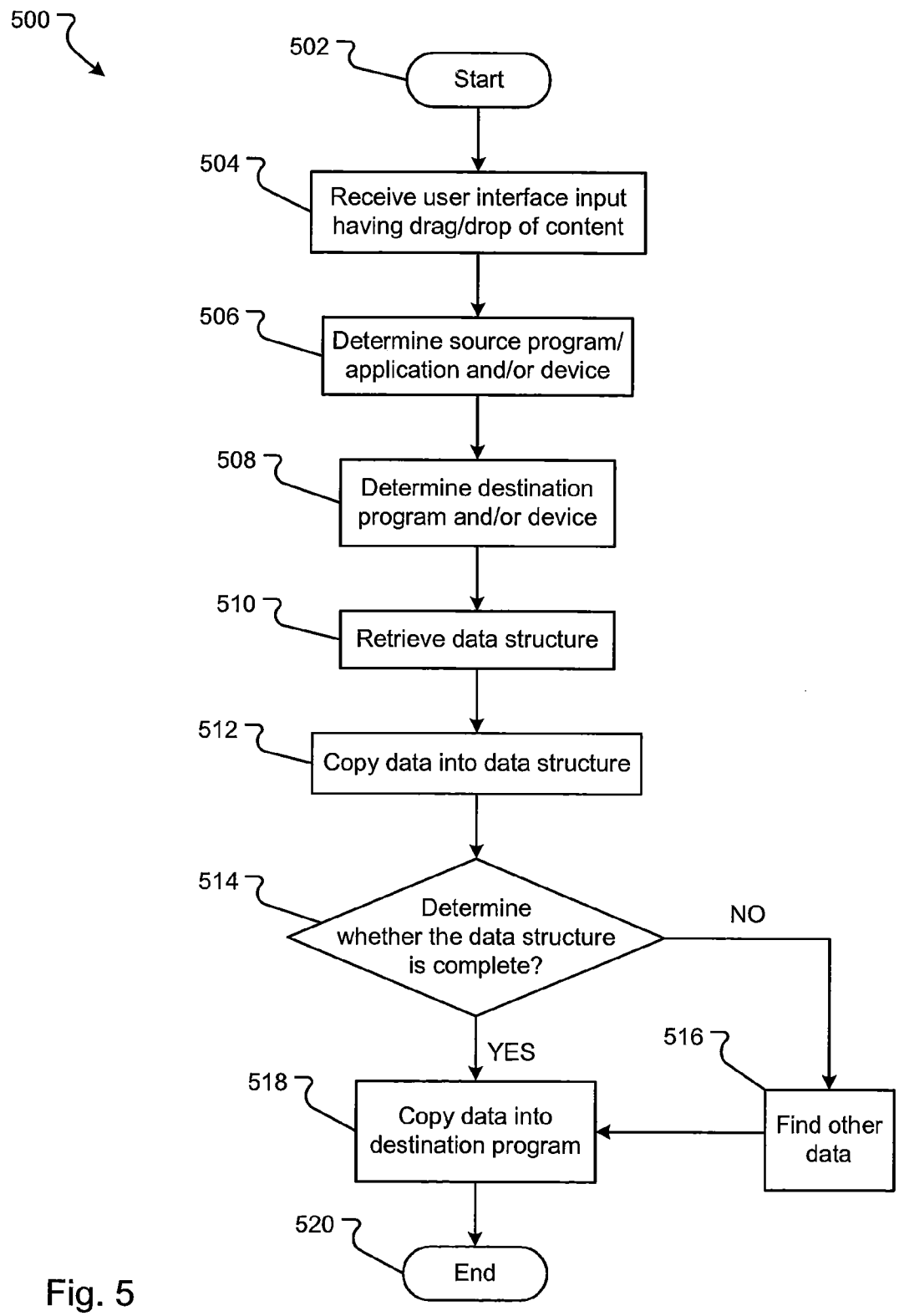
FIG. 5 is a flow diagram of an embodiment of a process for importing content.

An embodiment of a method 500 for importing content as shown in FIG. 5. Generally, the method 500 begins with a start operation 502 and terminates with an end operation 520. While a general order for the steps of the method 500 are shown in FIG. 5, the method 500 can include more or fewer steps or arrange the order of the steps differently than those shown in FIG. 5. The method 500 can be executed as a set of computer-executable instructions executed by a computer system and encoded or stored on a computer readable medium. Hereinafter, the method 500 shall be explained with reference to the systems, components, modules, data structures, user interfaces, etc. described in conjunction with FIGS. 1-4.

A user interface 204 receives a user interface input that includes the drag and drop of content, in step 504. The user interface 204 can be as shown in FIG. 3A. Thus, the user interface 204 may be a virtual desktop that stretches across the displays of two or more devices. The drag and drop of content can include the selection of content in a source application. For example, a cursor 316 selecting the name 310 in the phone application display 306 and dropping the content 314 into the contacts program 308. The user interface device 204 can interpret the drag and drop actions in the user interface 204 as a drag and drop of content and send the user interface selections to an interpolator 206.

The interpolator 206 can determine the information about the user interface actions, in step 506. The interpolator 206 can determine the source program, e.g., the phone application 306, and the destination program, e.g., the contacts program 308. Further, the interpolator 206 can determine the destination device, e.g., the computer 102, and the source device, e.g., the IP-enabled phone 104, in step 508. Further, the interpolator 206 may determine more information about the user interface action, for example, what content is dragged and dropped, other actions that occurred before or after the drag and drop user interface action (e.g., highlighting information or other user interface actions), other possible actions that may be taken with the content in the destination application (e.g., email the contact in the content, phone the contact in the content, etc.) or other information. The determined information from the interpolator 206 may then be sent to the data engine 202.

The data engine 202 can receive the information from the interpolator 206 and retrieve one or more data structures 402 and/or 410 associated with the drag and drop of content from the data structures database 208, in step 510. With the application and device information from the interpolator, the data engine 202 may scan the source/destination program pairings and/or the source/destination device pairings in one or more fields 404 of the devices data structure 402. Upon locating a match of one of the device/program pairings in the data field 404, the data engine 202 can read the pointer 408. Following the pointer 408, the data engine 202 can retrieve a data structure 410 from the data structures database 208.

The data engine 202 may then copy data from the source program into the data structure 410, in step 512. In embodiments, the data engine 202 determines from information or from the interpolator 206 what information is to be copied into the data structure 410. Further, the metadata, included with the data structure 410, may also be used to determine what information should be copied from the source program. For example, if a name is dragged and dropped from a phone application display 306, the data engine 202 might include the name of the person, the phone number of the person, the address of the person, a picture of the person, and any other identifying information about that person or associated with that person into the data structure 410. Thus, the data engine 202 copies and pastes, into the data structure 410, any available information stored with the phone application and associated with the drag and drop user interface action.

The data engine 202 may then determine whether the data copied from the phone application constitutes all the information that can be copied into the data structure 410, in step 514. For example, the data structure 410 associated with the drag and drop of content from the phone application to the contacts program may have one or more fields that the destination program 308 may include but that the source program 306 does not include. For example, the phone application may not store a picture of the person associated with the name data 310. In contrast, the contacts program 308 may have a picture field available to insert a thumbnail picture of the person. Other information may include other addresses, other phone numbers, e-mail addresses, and other such information that may be included in the contacts program. If not all the fields of the data structure 410 are filled, step 514 proceeds "NO" to step 516. If all the fields of data structure 410 are filled, then step 514 proceeds "YES" to step 518.

The data engine 202 can find other data from other sources to fill the data structure, in step 516. For example, the data engine 202 may interface with the personnel/customer database 108 to find other information about the person. The data engine 202 may use the name received from the source program to scan the personnel/customer database 108 for a name that is similar to the name received. If there is further information about the person in the personnel/customer database 108, the data engine 202 can copy that information from the personnel/customer database 108 into the data structure 410.

In other embodiments, the data engine 202 can interface with one or more external source(s) 110 through one or more networks, such as network 106. The external sources may include public and private databases (e.g., governmental sources, business sources, social media, etc.) or other programs or sources that are available on the Internet. The data engine 202, for example, can find a picture in Facebook associated with the name of the person and copy that picture into the data structure 410. The other information may then be stored in the data structure 410.

The data engine 202, upon receiving all the information, can copy the data from the data structure 410 into the destination program, in step 518. For example, the data engine 202 can copy information from the data structure 410 into the contacts program 308. As such, the data engine 202 populates the data entry 318 with information. In some embodiments, the data structure 410 may include information that is not needed for the contacts program 308 and may store that extra information as a separate link or data object that can be linked to or from the data entry 318.

During any of the copying from the source program, the personnel/customer database 108, external source(s) 110, or any other data source, the data engine 202 may employ a translator 210 to copy the data from a proprietary format into a general format (e.g., XML). Also, data pasted from the data structure 410 into the destination program may also be translated, by the translator 210, from the general format into a proprietary format. The translation requirements may be included in the metadata within the data structure 410.

Figure 6:
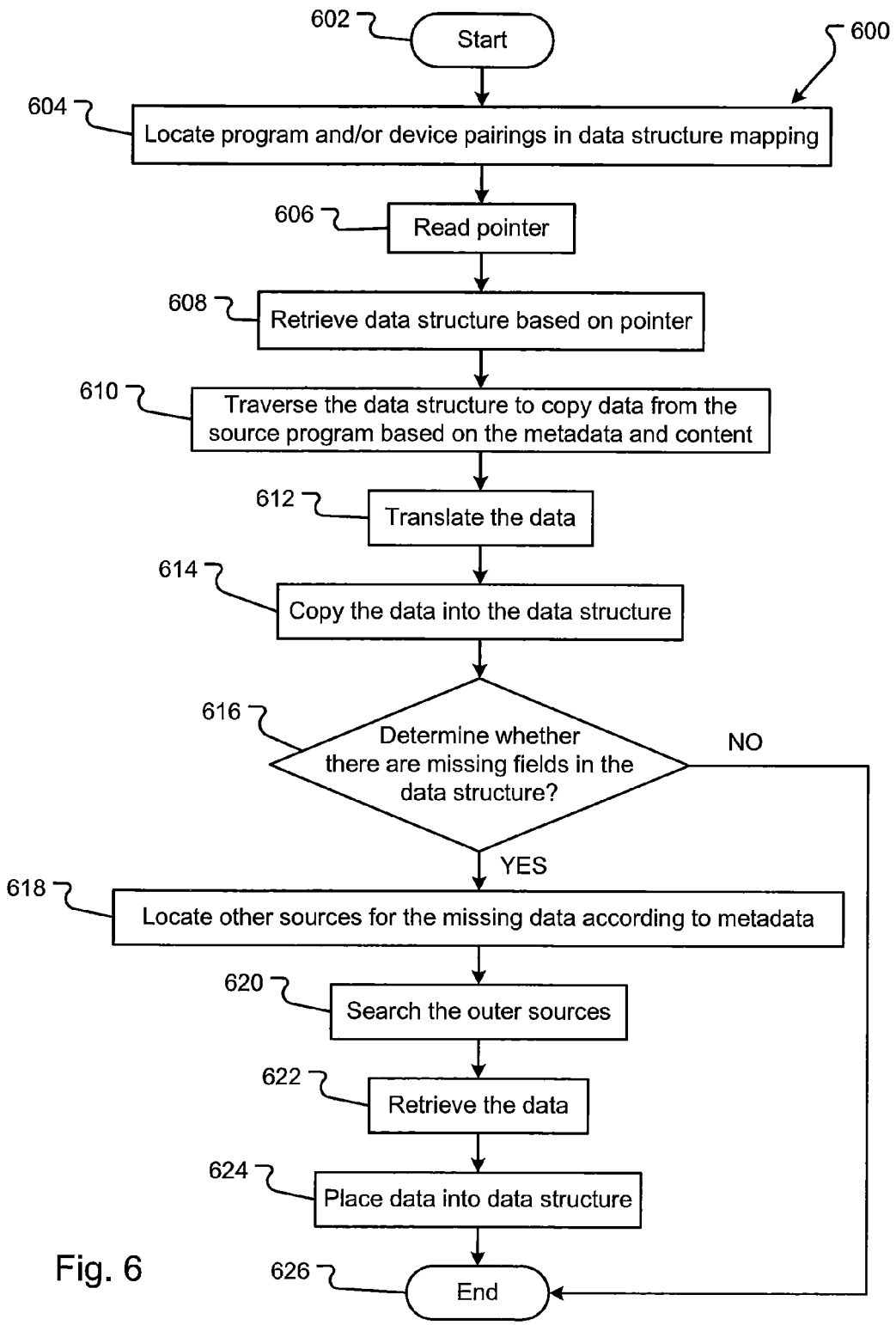
FIG. 6 is another flow diagram of an embodiment of a process for importing content.

An embodiment of a method 600 for copying data into a data structure for importing content is shown in FIG. 6. Generally, the method 600 begins with a start operation 602 and terminates with an end operation 626. While a general order for the steps of the method 600 are shown in FIG. 6, the method 600 can include more or fewer steps or arrange the order of the steps differently than those shown in FIG. 6. The method 600 can be executed as a set of computer-executable instructions executed by a computer system and encoded or stored on a computer readable medium. Hereinafter, the method 600 shall be explained with reference to the systems, components, modules, data structures, user interfaces, etc. described in conjunction with FIGS. 1-4.

A data engine 202 can locate a program and/or device pairing in the data structure 402, in step 604. The data engine 202 can receive information about the source and destination applications from an interpolator 206. The source and destination application information includes a pairing that can be searched within fields 404 of the devices data structure 402. Upon finding a match to the received pairing, the data engine 202 can read the pointer 408 from the devices data structure 402, in step 606.

The data engine 202 follows the pointer 408 to the data structure 410 and retrieves the data structure 410 based on the pointer 408, in step 606. Thus, the data engine 202 reads the data structure 410 into working memory. Upon storing the data structure 410 in working memory, the data engine 202 can traverse the data structure 410, in step 608. In traversing the data structure 410, the data engine 202 reads each field 414, 416, etc. within the data structure 410 and determines the required data for data fields 414, 416, etc. The type of data and where to locate the data may be included in metadata associated with the data structure 410. Further, the type of data or where to locate the data may also be associated with the content subject of the drop and drag user interface action. The data engine 202 may then copy data from one or more sources (for example, the source program, the personnel/customer database 108, external source(s) 110, etc). The data is copied into each field 414, 416, etc. as the data engine 202 traverses the data structure 410.

As the data is copied from the one or more sources, each source of data may provide the data in a proprietary, particular format. The data is translated into a general format, for example, XML, in step 610. While the data engine 202 copies the data, the translator 210 can translate the data. The translation may be according to metadata stored with the data structure 410. One or more mappings or keys for the translation may be stored in the data structure database 208 to facilitate the translation by the translator 210.

The translated data is then copied into the data structure 410 or translated while stored in the data structure 410, in step 612. The data engine 202 can receive the translated data from the translator 210 and insert the data into the data structure 410. Upon copying data from a source, the data engine 202 can determine if there are fields that are missing data, in step 614. For example, the data engine 202 can review the data structure 410, after copying all the relevant information from the source program, to determine if there are more fields without data in the data structure 410. If there are more fields that require data, then the data engine 202 can locate other sources of data. Thus, if there is missing data for one or more fields, step 614 flows "YES" to step 616. If all the fields include data, step 614 proceeds "NO" to end operation 624.

The data engine 202 can then locate other possible sources of data according to the metadata stored at the data structure 410, in step 614. For example, the metadata, associated with the data structure 410, may point to one or more additional sources that store data associated with the object of the user interface action. For example, if the data required is a picture, the metadata may point to the customer/personnel database 108 or one or more external source(s) 110. Upon determining where to locate the other data, the data engine 202 can search the other sources, in step 618. If the data is found in the other sources, the data engine 202 can retrieve that located data, in step 620. Here, the data engine 202 copies the data, provides the retrieved to a translator 210, and stores the translated data in the data structure 410, in step 622.

Figure 7:
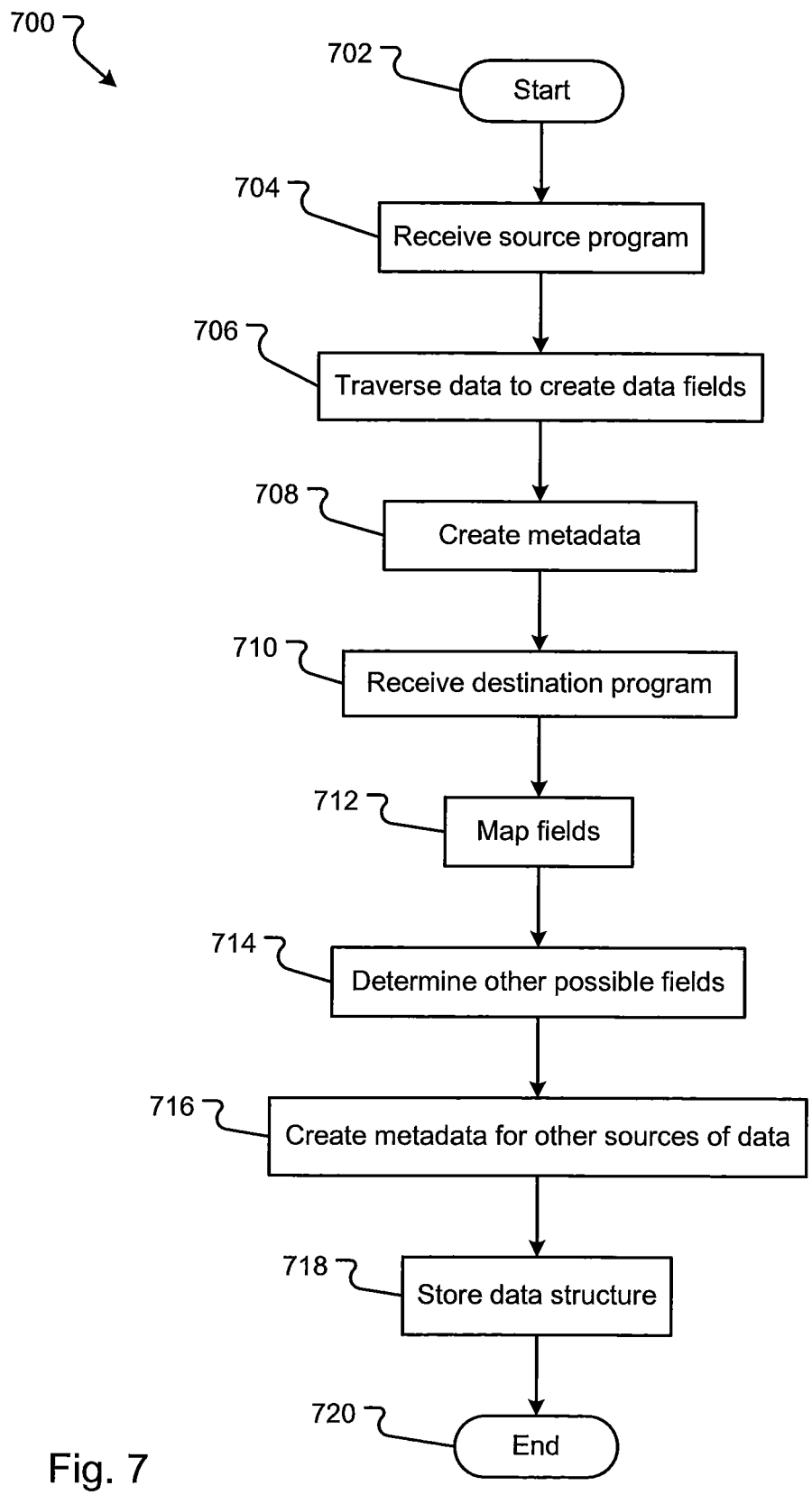
FIG. 7 is a flow diagram of an embodiment of a process for creating a data structure for importing content.

An embodiment of a method 700 for creating a data structure for importing content is shown in FIG. 7. Generally, the method 700 begins with a start operation 702 and terminates with an end operation 720. While a general order for the steps of the method 700 are shown in FIG. 7, the method 700 can include more or fewer steps or arrange the order of the steps differently than those shown in FIG. 7. The method 700 can be executed as a set of computer-executable instructions executed by a computer system and encoded or stored on a computer readable medium. Hereinafter, the method 700 shall be explained with reference to the systems, components, modules, data structures, user interfaces, etc. described in conjunction with FIGS. 1-4.

The data engine 202 can receive a source program for importing data, in step 704. The source program is the application 212 from which data will be copied to be provided to another application. The source program or application 212 can store or manipulate one or more types of data. The data engine 202 determines which data to put into a data structure by traversing the data structures in the application or source program to create fields for the data structure 410, in step 706.

Thus, the data engine 202 automatically determines the various types of data for the data structure 410 from data stored within the application. To determine the types of data, the data engine 202 may search for data that matches a certain data type through various artificial intelligence algorithms or programs. For example, the data engine 202 may look for natural language that matches certain types of data (e.g., names, addresses, phone numbers, etc.).

Upon determining the data fields for the data structure 410, the data engine 202 can create metadata for the data structure 410, in step 708. The metadata describes the data within each of the fields of the data structure 410. Thus, the data engine 202 can determine store metadata about where the data within the application source program 212 is found, what type of data the source application program 212 stores, how to translate the data, and other information required to import or copy the contents into the data structure 410.

The data engine 202 may then receive a destination application 212 in which the data is to be imported, in step 710. The destination application may store one or more items of data that may be the same or different from the source program. As such, the data engine 202 maps the data fields created in the data structure 410 to data that can be stored in the destination application, in step 712. The data engine 202 may also create metadata in data structure 410 to complete the mapping of the data fields in data structure 410 to data inputs in the destination application 212.

The data engine 202 may then traverse other data fields within the destination application to determine other possible data fields for which the destination application can accept data, in step 714. Similar to creating the data fields from the source application, the data engine 202 can traverse the data within the destination application to determine data accepted by the destination application 212. The one or more fields for data accepted by the destination application can be included in the data structure 410.

Also, similar to the data fields created from the source program, the data engine 202 can create metadata for the fields found in the destination application 212, in step 716. The fields created from the destination application 212 do not have a source for the data from the source program. As such, the data engine 202 must create metadata to point to a different source of data for the new data fields. The metadata can point to an external source(s) 110 or another data source, for example, the personnel/customer database 108. The metadata includes information required to access the other sources and import the data into the data structure 410. After all the different fields of the data structure 410 are created, the data engine 202 can store the data structure 410 into the data structure database 208, in step 718.

Figure 8:
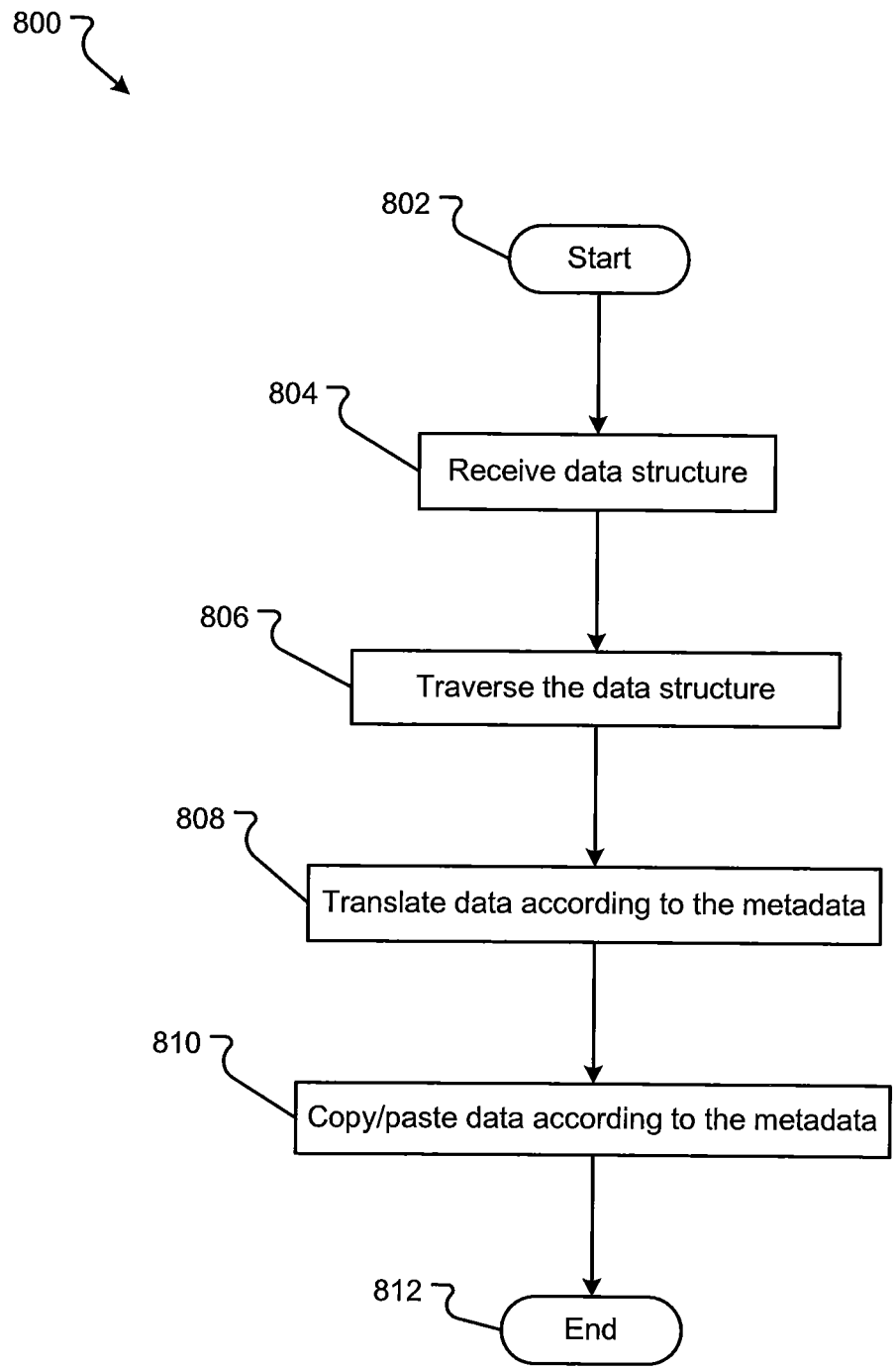
FIG. 8 is a flow diagram of an embodiment of a process for importing data using a data structure.

An embodiment for copying and pasting content is shown in FIG. 8. Generally, the method 800 begins with a start operation 802 and terminates with an end operation 812. While a general order for the steps of the method 800 are shown in FIG. 8, the method 800 can include more or fewer steps or arrange the order of the steps differently than those shown in FIG. 8. The method 800 can be executed as a set of computer-executable instructions executed by a computer system and encoded or stored on a computer readable medium. Hereinafter, the method 800 shall be explained with reference to the systems, components, modules, data structures, user interfaces, etc. described in conjunction with FIGS. 1-4.

The data engine 202 receives a data structure 410, in step 804. The data structure 410 includes one or more data fields 414 and/or 416. To copy data into the data structure 410, the data engine 202 traverses the data structure 410, in step 806.

In traversing the data structure 410, the data engine 202 reads the data required for each data field 414 and/or 416. To determine the data required in the data fields 414 and/or 416, the data engine 202 reads the metadata associated with the data fields 414 and/or 416 to determine where to find the data.

The data engine 202 searches for, finds, and extracts the data from one or more sources including, but not limited to, the personnel/customer database 108, one or more external source(s) 110, or from the source application 212. The data, once read, may be translated according to the metadata associated with the data field, in step 808. A translator 210 can translate the data from its native format from the source into a standard format, such as XML. The translated data may be input into the data structure 410. Once the data structure 410 is completed, with the data extracted from the one or more sources, the data engine 202 can then copy the data from data structure 410 and paste the data into the destination application 212, in step 810. In pasting the data from the data structure 410, the data engine 202 can read the metadata associated with each data field 414 and/or 416 to translate the data or copy the data in a manner prescribed by the destination application 212.

In alternative embodiments, the software system 200 may determine a best action for the content based on where the content is dropped. Rather than simply pasting the content, the data engine 202 can determine if the content may be used in a function provided by the destination application 212. For example, if a phone number is dragged from a contacts program (e.g., Microsoft Outlook) and dropped into a communication application (e.g., a phone application executing on the IP-enabled phone 104), the best action may be to call the person associated with the content. Thus, the data engine 202 may, according to the metadata associated with the content, start a feature or application to use the content rather than pasting the content. As such, the drag and drop of content may cause other action beyond a simple importation of information.

FIG. 9 illustrates a block diagram of a computing environment 900 that may function as system or environment for the embodiments described herein. The system 900 includes one or more user computers 905, 910, and 915. The user computers 905, 910, and 915 may be general purpose personal computers (including, merely by way of example, personal computers and/or laptop computers running various versions of Microsoft Corp.'s Windows™ and/or Apple Corp.'s Macintosh™ operating systems) and/or workstation computers running any of a variety of commercially-available UNIX™ or UNIX-like operating systems. These user computers 905, 910, 915 may also have any of a variety of applications, including for example, database client and/or server applications, and web browser applications. Alternatively, the user computers 905, 910, and 915 may be any other electronic device, such as a thin-client computer, Internet-enabled mobile telephone, and/or personal digital assistant, capable of communicating via a network (e.g., the network 920 described below) and/or displaying and navigating web pages or other types of electronic documents. Although the exemplary system 900 is shown with three user computers, any number of user computers may be supported.

System 900 further includes a network 920. The network 920 can be any type of network familiar to those skilled in the art that can support data communications using any of a variety of commercially-available protocols, including, without limitation, TCP/IP, SNA, IPX, AppleTalk, and the like. Merely by way of example, the network 920 maybe a local area network ("LAN"), such as an Ethernet network, a Token-Ring network and/or the like; a wide-area network; a virtual network, including without limitation a virtual private network ("VPN"); the Internet; an intranet; an extranet; a public switched telephone network ("PSTN"); an infra-red network; a wireless network (e.g., a network operating under any of the IEEE 802.11 suite of protocols, the Bluetooth™ protocol known in the art, and/or any other wireless protocol); and/or any combination of these and/or other networks.

The system 900 may also include one or more server computers 925, 930. One server may be a web server 925, which may be used to process requests for web pages or other electronic documents from user computers 905, 910, and 915. The web server can be running an operating system including any of those discussed above, as well as any commercially-available server operating systems. The web server 925 can also run a variety of server applications, including HTTP servers, FTP servers, CGI servers, database servers, Java servers, and the like. In some instances, the web server 925 may publish operations available operations as one or more web services.

The system 900 may also include one or more file and or/application servers 930, which can, in addition to an operating system, include one or more applications accessible by a client running on one or more of the user computers 905, 910, 915. The server(s) 930 may be one or more general purpose computers capable of executing programs or scripts in response to the user computers 905, 910 and 915. As one example, the server may execute one or more web applications. The web application may be implemented as one or more scripts or programs written in any programming language, such as Java™, C, C#™ or C++, and/or any scripting language, such as Perl, Python, or TCL, as well as combinations of any programming/scripting languages. The application server(s) 930 may also include database servers, including without limitation those commercially available from Oracle, Microsoft, Sybase™, IBM™ and the like, which can process requests from database clients running on a user computer 905.

The web pages created by the web application server 930 may be forwarded to a user computer 905 via a web server 925. Similarly, the web server 925 may be able to receive web page requests, web services invocations, and/or input data from a user computer 905 and can forward the web page requests and/or input data to the web application server 930. In further embodiments, the server 930 may function as a file server. Although for ease of description, FIG. 5 illustrates a separate web server 925 and file/application server 930, those skilled in the art will recognize that the functions described with respect to servers 925, 930 may be performed by a single server and/or a plurality of specialized servers, depending on implementation-specific needs and parameters. The computer systems 905, 910, and 915, file server 925 and/or application server 930 may function as servers or other systems described herein.

The system 900 may also include a database 935. The database 935 may reside in a variety of locations. By way of example, database 935 may reside on a storage medium local to (and/or resident in) one or more of the computers 905, 910, 915, 925, 930. Alternatively, it may be remote from any or all of the computers 905, 910, 915, 925, 930, and in communication (e.g., via the network 920) with one or more of these. In a particular set of embodiments, the database 935 may reside in a storage-area network ("SAN") familiar to those skilled in the art. Similarly, any necessary files for performing the functions attributed to the computers 905, 910, 915, 925, 930 may be stored locally on the respective computer and/or remotely, as appropriate. In one set of embodiments, the database 935 may be a relational database, such as Oracle 10i™, that is adapted to store, update, and retrieve data in response to SQL-formatted commands. Database 935 may be the same as or similar to the database used herein.

FIG. 10 illustrates one embodiment of a computer system 1000 upon which servers or other systems described herein may be deployed or executed. The computer system 1000 is shown comprising hardware elements that may be electrically coupled via a bus 1055. The hardware elements may include one or more central processing units (CPUs) 1005; one or more input devices 1010 (e.g., a mouse, a keyboard, etc.); and one or more output devices 1015 (e.g., a display device, a printer, etc.). The computer system 1000 may also include one or more storage device 1020. By way of example, storage device(s) 1020 may be disk drives, optical storage devices, solid-state storage device such as a random access memory ("RAM") and/or a read-only memory ("ROM"), which can be programmable, flash-updateable and/or the like.

The computer system 1000 may additionally include a computer-readable storage media reader 1025; a communications system 1030 (e.g., a modem, a network card (wireless or wired), an infra-red communication device, etc.); and working memory 1040, which may include RAM and ROM devices as described above. In some embodiments, the computer system 1000 may also include a processing acceleration unit 1035, which can include a DSP, a special-purpose processor and/or the like.

The computer-readable storage media reader 1025 can further be connected to a computer-readable storage medium, together (and, optionally, in combination with storage device(s) 1020) comprehensively representing remote, local, fixed, and/or removable storage devices plus storage media for temporarily and/or more permanently containing computer-readable information. The communications system 1030 may permit data to be exchanged with the network 1020 and/or any other computer described above with respect to the system 1000. Moreover, as disclosed herein, the term "storage medium" may represent one or more devices for storing data, including read only memory (ROM), random access memory (RAM), magnetic RAM, core memory, magnetic disk storage mediums, optical storage mediums, flash memory devices and/or other machine readable mediums for storing information.

The computer system 1000 may also comprise software elements, shown as being currently located within a working memory 1040, including an operating system 1045 and/or other code 1050, such as program code implementing the servers or devices described herein. It should be appreciated that alternate embodiments of a computer system 1000 may have numerous variations from that described above. For example, customized hardware might also be used and/or particular elements might be implemented in hardware, software (including portable software, such as applets), or both. Further, connection to other computing devices such as network input/output devices may be employed.

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other types of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

Specific details were given in the description to provide a thorough understanding of the embodiments. However, it will be understood by one of ordinary skill in the art that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Also, it is noted that the embodiments were described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium such as storage medium. A processor(s) may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

While illustrative embodiments have been described in detail herein, it is to be understood that the inventive concepts may be otherwise variously embodied and employed, and that the appended claims are intended to be construed to include such variations, except as limited by the prior art.

What is claimed is:

1. A method for importing content, comprising:
receiving, by a processor, a user interface action in a user interface display, wherein the user interface display is a virtual desktop display across both a first display of an IP-enabled phone application in an IP-enabled phone and a second display of a computer, wherein the computer is a device that is separate from the IP-enabled phone, and wherein the user interface action includes:
a selection of content in the first display of the IP-enabled phone application executed by the IP-enabled phone,
a drag of the selected content to the second display of the computer application executed by the computer, and
a drop of the selected content into the second display of the computer application; the process determining, by the user interface action, a first pairing of the IP-enabled phone application and the computer application;
based on the first pairing, retrieving, by the processor, a data structure for importing content between the IP-enabled phone application and the computer application;
copying, by the processor, the selected content from the IP-enabled phone application into the data structure;
determining, by the processor, that a field in the retrieved data structure is missing second content;
determining, by the processor, another source of the missing second content;
determining another source of the missing second content comprises searching one or more social networking sites for the information;
copying, by the processor, the missing second content into the data structure; and
pasting, by the processor, the selected content and the missing second content into the computer application.

2. The method as defined in claim 1, wherein the computer application is a contacts program and wherein the selected content is a name of a person.

3. The method as defined in claim 2, wherein the second content is at least one of an address of the person, a phone number of the person, an email of the person, or a picture of the person.

4. The method as defined in claim 1, wherein the computer application is a communication application, wherein the selected content is text name of a person, and in response to the dropping of the text name of the person, calling the person.

5. A system of computing devices comprising:
a first device comprising:
a first memory;
a first display configured to display a virtual desktop including a first application display;
a first processor in communication with the first memory, the first processor configured to execute a first application; and
a second device comprising:
a second memory;
a second display configured to display the virtual desktop including a second application display;
a second processor in communication with the second memory, the second processor configured to execute a second application, the second processor being configured to:
receive a selection of content in the second application display;
determine that other content is missing from a data structure:
retrieve the data structure;
determine another source of the other content by searching one or more social networking sites for the information;
copy the selected content and the other content into the data structure; and
send the data structure to the first device.

6. The system of computing devices as defined in claim 5, the second processor further configured to:
determine a pairing of the first application and the second application; and
based on the pairing, retrieving the data structure.

7. The system of computing devices as defined in claim 5, the first processor further configured to:
receive the data structure from the second device; and
copy the selected data and the other data from the data structure into the first application.

8. The system of computing devices as defined in claim 7, the first processor further configured to:
   determine that a field in the data structure does not contain content;
   determine another source for the missing content; and
   retrieve the missing content from the other source.

9. The system of computing devices as defined in claim 8, wherein the other source for the missing content is provided in metadata associated with the data structure and the missing content.

10. The system of computing devices as defined in claim 5, the first processor further configured to translate the selected content and the other content from a first proprietary format used by the first application into a general format.

11. The system of computing devices as defined in claim 5, the second processor further configured to translate the selected content and the other content in the data structure from the general format into a second proprietary format used by the second application.

12. A non-transient computer program product including computer executable instructions stored onto a computer readable medium which, when executed by a processor of a computer, causes the computer to perform a method for importing content, the instructions comprising:
   instructions to receive a selection of content in a user interface display of a first application;
   instructions to receive a drop of the selected content in a user interface display of a second application;
   instructions to determine that other content is missing from a data structure;
   in response to the drop, instructions to determine a location of the other content;
   determining another source of a second content comprises searching one or more social networking sites for the information; and
   instructions to import the selected content and the other content into the second application.

13. The computer program product as defined in claim 12, further comprising instructions to determine the first application based on the selection of content.

14. The computer program product as defined in claim 13, further comprising instructions to determine the second application based on the drop of the selected content, wherein the first and second application are different.

15. The computer program product as defined in claim 14, further comprising:
   based on the first and second applications, instructions to retrieve a data structure; and instructions to copy the selected content and the other content into the data structure to import into the second application.

16. The computer program product as defined in claim 15, further comprising, before copying the selected data into the data structure, instructions to translate the selected data from a first proprietary format, as stored in the first application, into a general format.

17. The computer program product as defined in claim 16, before importing the data in the data structure into the second application, instructions to translate the general format data in the data structure into a second proprietary format as stored in the second application.

18. The computer program product as defined in claim 17, wherein the first application executes on a first device and the second application executes on a second device.

19. The computer program product as defined in claim 13, further comprising, based on the selected content and the second application, instructions to cause the second application to execute a function of the second application with the selected content.

* * * * *